(12) United States Patent
Rong et al.

(10) Patent No.: US 12,467,622 B2
(45) Date of Patent: Nov. 11, 2025

(54) CARBON-COATED NICKEL-ALUMINUM NANOCOMPOSITE, PREPARATION METHOD THEREFOR AND APPLICATION THEREOF

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Junfeng Rong, Beijing (CN); Peng Yu, Beijing (CN); Jingxin Xie, Beijing (CN); Genghuang Wu, Beijing (CN); Mingsheng Zong, Beijing (CN); Weiguo Lin, Beijing (CN); Hongbo Ji, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 665 days.

(21) Appl. No.: 17/755,112

(22) PCT Filed: Oct. 20, 2020

(86) PCT No.: PCT/CN2020/122099
§ 371 (c)(1),
(2) Date: Apr. 21, 2022

(87) PCT Pub. No.: WO2021/078113
PCT Pub. Date: Apr. 29, 2021

(65) Prior Publication Data
US 2022/0370989 A1    Nov. 24, 2022

(30) Foreign Application Priority Data

Oct. 21, 2019 (CN) .......................... 201911001557.6
Oct. 21, 2019 (CN) .......................... 201911001564.6

(51) Int. Cl.
*F23C 13/08* (2006.01)
*B01D 53/86* (2006.01)
(Continued)

(52) U.S. Cl.
CPC .......... *F23C 13/08* (2013.01); *B01D 53/8628* (2013.01); *B01D 53/8668* (2013.01);
(Continued)

(58) Field of Classification Search
None
See application file for complete search history.

(56) References Cited

U.S. PATENT DOCUMENTS

| 4,191,664 A * | 3/1980 | McArthur | B01J 23/755 |
| | | | 518/715 |
| 6,843,919 B2 * | 1/2005 | Klabunde | B01J 20/041 |
| | | | 210/660 |

(Continued)

FOREIGN PATENT DOCUMENTS

| CN | 101811052 A | 8/2010 |
| CN | 104815983 A | 8/2015 |

(Continued)

OTHER PUBLICATIONS

Patange et al. "Morphology-controlled synthesis of monodispersed graphitic carbon coated core/shell structured Ni/NiO nanoparticles with enhanced magnetoresistance", Phys.Chem. Chem. Phys., 2015, 17, 32398 (Year: 2015).*

(Continued)

*Primary Examiner* — Pamela H Weiss
*Assistant Examiner* — Jialan Zhang
(74) *Attorney, Agent, or Firm* — NKL Law; Allen Xue

(57) ABSTRACT

A nanocomposite has a core-shell structure with an outer shell and an inner core. The outer shell is a graphitized carbon film, and the inner core contains nickel oxide and alumina, with a nickel oxide content of 59%-80%, an alumina content of 19%-40%, and a carbon content of not more than 1%, based on the total weight of the nanocomposite. The process for catalytic combustion of volatile organic compounds may utilize the nanocomposite as a catalyst.

24 Claims, 6 Drawing Sheets

(51) Int. Cl.
| | | |
|---|---|---|
| *B01J 21/18* | (2006.01) | |
| *B01J 23/78* | (2006.01) | |
| *B01J 35/45* | (2024.01) | |
| *B01J 35/70* | (2024.01) | |
| *B01J 37/02* | (2006.01) | |
| *B01J 37/03* | (2006.01) | |
| *B01J 37/08* | (2006.01) | |
| *B01J 37/14* | (2006.01) | |
| *B01J 37/18* | (2006.01) | |
| *B22F 1/16* | (2022.01) | |

(52) U.S. Cl.
CPC .......... *B01D 53/8687* (2013.01); *B01J 21/18* (2013.01); *B01J 23/78* (2013.01); *B01J 35/45* (2024.01); *B01J 35/70* (2024.01); *B01J 37/0219* (2013.01); *B01J 37/0221* (2013.01); *B01J 37/031* (2013.01); *B01J 37/088* (2013.01); *B01J 37/14* (2013.01); *B01J 37/18* (2013.01); *B22F 1/16* (2022.01); *B01D 2255/20753* (2013.01); *B01D 2255/2092* (2013.01); *B01D 2255/702* (2013.01); *B01D 2255/9202* (2013.01); *B01D 2257/402* (2013.01); *B01D 2257/7022* (2013.01); *B01D 2257/708* (2013.01); *B01J 2235/00* (2024.01); *B01J 2235/15* (2024.01); *B01J 2235/30* (2024.01)

(56) References Cited

U.S. PATENT DOCUMENTS

| | | |
|---|---|---|
| 2004/0065619 A1 | 4/2004 | Klabunde et al. |
| 2017/0081248 A1* | 3/2017 | Jeong ........................ B22F 1/00 |

FOREIGN PATENT DOCUMENTS

| | | |
|---|---|---|
| CN | 106872545 A | 6/2017 |
| CN | 107469824 A | 12/2017 |
| CN | 108212035 A | 6/2018 |
| CN | 108856706 A | 11/2018 |
| CN | 109309213 A | 2/2019 |
| JP | 2004230317 A | 8/2004 |
| JP | 2007152263 A | 6/2007 |
| JP | 2011513167 A | 4/2011 |
| JP | 2015536235 A | 12/2015 |
| WO | 2019020086 A1 | 1/2019 |

OTHER PUBLICATIONS

Liang et al., "Carbon-supported Ni@NiO/Al2O3 integrated nanocomposite derived from layered double hydroxide precursor as cycling-stable anodematerials for lithium-ion batteries", Electrochimica Acta 108 (2013) 429-434 (Year: 2013).*

Gao et al. "Improved cycle performance of nitrogen and phosphorus co-doped carbon coatings on lithium nickel cobalt aluminum oxide battery material", J Mater Sci (2018) 53:9662-9673 (Year: 2018).*

* cited by examiner

CARBON-COATED NICKEL-ALUMINUM NANOCOMPOSITE, PREPARATION METHOD THEREFOR AND APPLICATION THEREOF

TECHNICAL FIELD

The invention relates to the technical field of catalysis, in particular to a carbon-coated nickel-aluminum nanocomposite, a preparation process and use thereof, such as a process of catalytically combusting volatile organic compounds.

BACKGROUND

Transition metal oxides have excellent catalytic performance and electromagnetic performance, is a research hotspot in the field of inorganic materials, and has wide use in energy storage materials, catalytic materials, magnetic recording materials and biomedicine. In recent years, carbon-coated nanomaterials are widely used in the fields of electrocatalysis, supercapacitor materials, lithium ion battery anode materials, bioengineering and the like.

One of the conventional processes for producing adipic acid oxidation of cyclohexanol with nitric acid, which however produces a large amount of $N_2O$ during the reaction. Therefore, purifying the tail gas of an adipic acid device, and effective control and elimination of $N_2O$, have become the research focus in the field of environmental catalysis.

A direct catalytic decomposition process can decompose $N_2O$ into nitrogen and oxygen, and is the most effective and clean technology for eliminating $N_2O$. Among others, catalyst is the core of the direct catalytic decomposition process. The catalysts for decomposing $N_2O$, which are currently researched and reported, mainly comprise a noble metal catalyst, an ion-exchanged molecular sieve catalyst and a transition metal oxide catalyst, but the large-scale use of the noble metal catalyst is limited by the expensive price. The prices of molecular sieve catalysts and transition metal oxide catalysts are obviously lower than that of noble metals, but the activities of the two catalysts for $N_2O$ catalytic decomposition of $N_2O$ is low at present, the temperature range for efficient decomposition is 450-550° C., and the decomposition can be carried out only by diluting high-concentration $N_2O$ to about 0.5-2%, so that the industrial cost is greatly increased.

Therefore, development of catalysts with low cost and high activity has important significance for the emission reduction of $N_2O$.

Volatile Organic Compounds (VOCs) are organic compounds having a saturated vapor pressure at room temperature of greater than 70 Pa and a boiling point at atmospheric pressure of 260° C. or lower. VOCs are in various types and mainly comprise alkanes, aromatics, esters, aldehydes, halogenated hydrocarbons and the like.

There are two main types of purification processes for VOCs: the first type is physical absorption or adsorption. The second type is a chemical reaction process. Among the chemical reaction processes, combustion technology is widely applied, which is particularly divided into direct flame combustion and catalytic combustion.

Catalyst is the core of the catalytic combustion technology. The catalysts for catalytic combustion of VOCs reported in the current research mainly comprise noble metal catalysts and non-noble metal oxide catalysts. Among others, noble metal catalysts (such as Pt, Ru, Au, Pd, etc.) have good performance, but are expensive and easy to be poisoned; while non-noble metal oxide catalysts (such as $Co_2O_3$, $MnO_2$, $CeO_2$, CuO, $TiO_2$, perovskite and the like) are low in cost and poison resistant, but have low catalytic activity.

Therefore, development of catalysts with low cost and high activity is an urgent problem to be solved in the field of catalytic combustion of VOCs.

It should be noted that the information disclosed in the foregoing background section is provide only for enhancement of understanding background of the invention, and therefore, it may contain information that does not form the prior art that is already known to a person of ordinary skill in the art.

SUMMARY OF THE INVENTION

It is a primary purpose of the present invention to overcome at least one of the above-mentioned drawbacks of the prior art and to provide a carbon-coated nickel-aluminum nanocomposite. The nanocomposite has a core-shell structure including a graphitized carbon shell and an inner core of nickel oxide and alumina, which has excellent activity as a catalyst, can effectively catalyze decomposition of nitrous oxide, and helps to solve the problem of elimination of high-concentration of $N_2O$ exhaust gas generated during the production process of adipic acid plants, nitric acid plants, and the like. The nanocomposite can also be used as a catalyst for a process for catalytic combustion of volatile organic compounds, can catalyze the oxidation and combustion of VOCs at low temperature with high efficiency, and is beneficial for solving the problem of purification of VOCs.

For the purpose above, the present invention provides the following technical solutions:

A first aspect of the invention provides a carbon-coated nickel-aluminum nanocomposite, which comprises a core-shell structure with an outer film as shell and an inner core, wherein the outer film is a graphitized carbon film, and the inner core comprises nickel oxide and alumina, with a nickel oxide content of 59%-80%, an alumina content of 19%-40%, and a carbon content of not more than 1%, based on the total weight of the nanocomposite.

According to one embodiment of the invention, the nickel oxide content is 69%-79%, the alumina content is 20%-30%, and the carbon content is 0.3%-1%.

According to one embodiment of the invention, the nanocomposite is substantially free of elemental nickel. According to the invention, for example, the nanocomposite has a content of elemental nickel of not more than 1%, not more than 0.5%, not more than 0.1%, or not more than 0.01%.

According to one embodiment of the present invention, in the nanocomposite, the weight ratio of the carbon element content determined by X-ray photoelectron spectroscopy to the carbon element content determined by elemental analysis is not less than 10.

According to one embodiment of the present invention, the nanocomposite has a Raman spectrum with a ratio of the intensity of a G peak located near 1580 cm$^{-1}$ to the intensity of a D peak located near 1320 cm$^{-1}$ of greater than 2.

According to one embodiment of the invention, the core-shell structure has a particle size of 2 nm to 100 nm, preferably 5 nm to 80 nm.

According to one embodiment of the invention, the core also comprises an alkali metal oxide, in an amount of not more than 5% by weight, preferably not more than 2.5% by weight, relative to the weight of nanocomposite. For example, the content of the alkali metal oxide is 0.1% to 5%, preferably 0.5% to 2.5%, by weight, based on the nanocomposite.

A second aspect of the present invention provides a process for preparing the carbon-coated nickel-aluminum nanocomposite, comprising the steps of: preparing a nickel-aluminum precursor; carrying out a heating treatment on the nickel-aluminum precursor, and carrying out a vapor deposition by using a lower alkane as a carbon source gas; and carrying out oxygen treatment on the product obtained after the vapor deposition, to provide the nanocomposite.

According to one embodiment of the invention, the oxygen treatment comprises introducing a standard gas into the product obtained after the vapor deposition and heating, wherein the standard gas contains oxygen and a balance gas, with a concentration of the oxygen of 10-40 vol %.

According to one embodiment of the present invention, the oxygen treatment is carried at a temperature of 200° C. to 500° C. for 0.5 h to 10 h.

According to one embodiment of the present invention, the nickel-aluminum precursor is prepared by a manner of coprecipitation and/or hydrothermal crystallization.

According to one embodiment of the present invention, the nickel-aluminum precursor is prepared by steps comprising: simultaneously dropwise adding an alkaline solution and an aqueous solution containing trivalent aluminum salt and divalent nickel salt into water for precipitation treatment, so that the trivalent aluminum salt and the divalent nickel salt generate a coprecipitate; and aging the coprecipitate.

According to one embodiment of the invention, the trivalent aluminum salt comprises aluminum nitrate and/or aluminum chloride, the divalent nickel salt comprises nickel nitrate and/or nickel chloride, and the molar ratio of aluminum in the trivalent aluminum salt to nickel in the divalent nickel salt is 1:(2-4). The alkaline solution is an aqueous solution containing sodium hydroxide and sodium carbonate, with a concentration of sodium hydroxide in the alkaline solution of 0.2-4 mol/L, and a concentration of sodium carbonate of 0.1-2 mol/Lalkaline solution. The molar ratio of sodium hydroxide to the total moles of aluminum and nickel in the trivalent aluminum salt and the divalent nickel salt is (2-4): 1, and the molar ratio of sodium carbonate to the total moles of aluminum and nickel in the trivalent aluminum salt and the divalent nickel salt is (0.5-2): 1.

According to one embodiment of the present invention, the precipitation treatment is carried out at a temperature of 40° C. to less than 100° C., and the aging treatment is carried out at a temperature of 40° C. to less than 100° C. for 2 to 48 hours.

According to one embodiment of the invention, the process further comprises the step of contacting the nickel-aluminum precursor subjected to the temperature-rising heat treatment with hydrogen to perform reduction treatment, at a treatment of 500-900° C., for 120-480 min, with a hydrogen flow rate of 30-50 ml/(min. g nickel-aluminum precursor).

According to one embodiment of the invention, the process further comprises mixing a nickel-aluminum precursor and a salt solution of an alkali metal for coprecipitation reaction, and then carrying out a temperature-rising heat treatment on the obtained precipitate, wherein the molar ratio of the alkali metal to nickel is not more than 0.2.

According to one embodiment of the invention, the temperature-rising heat treatment comprises raising the temperature of the nickel-aluminum precursor to 500-900° C. in the presence of a protective gas, wherein the protective gas is nitrogen and/or argon, with a flow rate of the protective gas of 10-500 ml/(min g nickel-aluminum precursor), and a temperature-rising speed of 1-5° C./min. The vapor deposition is carried out at a temperature of 750-900° C., preferably 780-850° C., for preferably 5-240 minutes, with a flow rate of carbon source gas of 10-500 ml/(min g nickel/aluminum precursor). Preferably, the vapor deposition is carried out for 60-120 minutes, with a flow rate of the carbon source gas of 30 to 100 ml/(min g nickel-aluminum precursor). The carbon source gas is methane or ethane.

A third aspect of the present invention provides the use of the above nanocomposite as a catalytic material, an energy storage material or an electromagnetic material.

A fourth aspect of the present invention provides the use of the above nanocomposite as a catalyst for decomposing nitrous oxide, comprising: contacting the catalyst with nitrous oxide for a catalytic decomposition reaction, to generate nitrogen and oxygen.

According to one embodiment of the invention, the catalytic decomposition reaction is carried out at a temperature of 300° C.-400° C.

According to one embodiment of the present invention, the catalytic decomposition reaction is carried out at a space velocity of 1000-3000 ml reactant gas/(hour g catalyst).

According to one embodiment of the invention, the nitrous oxide is present in a concentration of 30% to 40% by volume.

According to the technical solutions above, the carbon-coated nickel-aluminum nanocomposite and the preparation process and use thereof have the advantages and positive effects that:

The carbon-coated nickel-aluminum nanocomposite provided by the invention comprises a core-shell structure with a shell of a graphitized carbon film and a core of nickel oxide and alumina, has excellent activity when being used as a catalyst for catalyzing the decomposition reaction of $N_2O$ through unique structure and composition, and can be used for catalyzing and decomposing high-concentration nitrous oxide waste gas generated in industrial production at a lower temperature, for which the decomposition rate can reach more than 99%, and the carbon-coated nickel-aluminum nanocomposite has an important significance for protecting the environment and reducing atmospheric pollution and has a good industrial application prospect, compared with the existing catalyst which needs to dilute and then treat $N_2O$ in industrial waste gas.

In another aspect, the present invention provides a process of catalytically combusting volatile organic compounds, comprising: using the carbon-coated nickel-aluminum nanocomposite as a catalyst to catalyze volatile organic compounds, for an oxidation reaction.

According to one embodiment of the present invention, the oxidation reaction comprises catalytic combustion of a mixed gas containing volatile organic compounds and a standard gas containing oxygen by contacting the mixed gas with a catalyst.

According to one embodiment of the present invention, the mixed gas comprises 0.01-2 vol % of the volatile organic compounds, and 5-20 vol % of oxygen.

According to one embodiment of the invention, the volatile organic compound is one or more selected from the group consisting of hydrocarbons having 1 to 4 carbon atoms.

According to one embodiment of the present invention, the oxidation reaction is carried out at a space velocity of 1000-5000 ml reaction gas/(hour g catalyst).

According to one embodiment of the invention, the oxidation reaction is carried out at a temperature of 300° C.-450° C.

According to the technical solutions above, the catalytic combustion of the volatile organic compounds has the advantages and positive effects that:

The process for catalytic combustion of volatile organic compounds provided by the invention has excellent catalytic activity, can catalyze the oxidation combustion of VOCs at a low temperature with high efficiency, is beneficial to solving the problem of purification of VOCs, reduces air pollution, and has good industrial application prospect.

DRAWINGS

The drawings are provided for further understanding the invention and constitute a part of this specification, which, together with the embodiments below, serve to explain the principles of the invention and not to limit the invention.

EMBODIMENTS OF THE INVENTION

Figure 1:
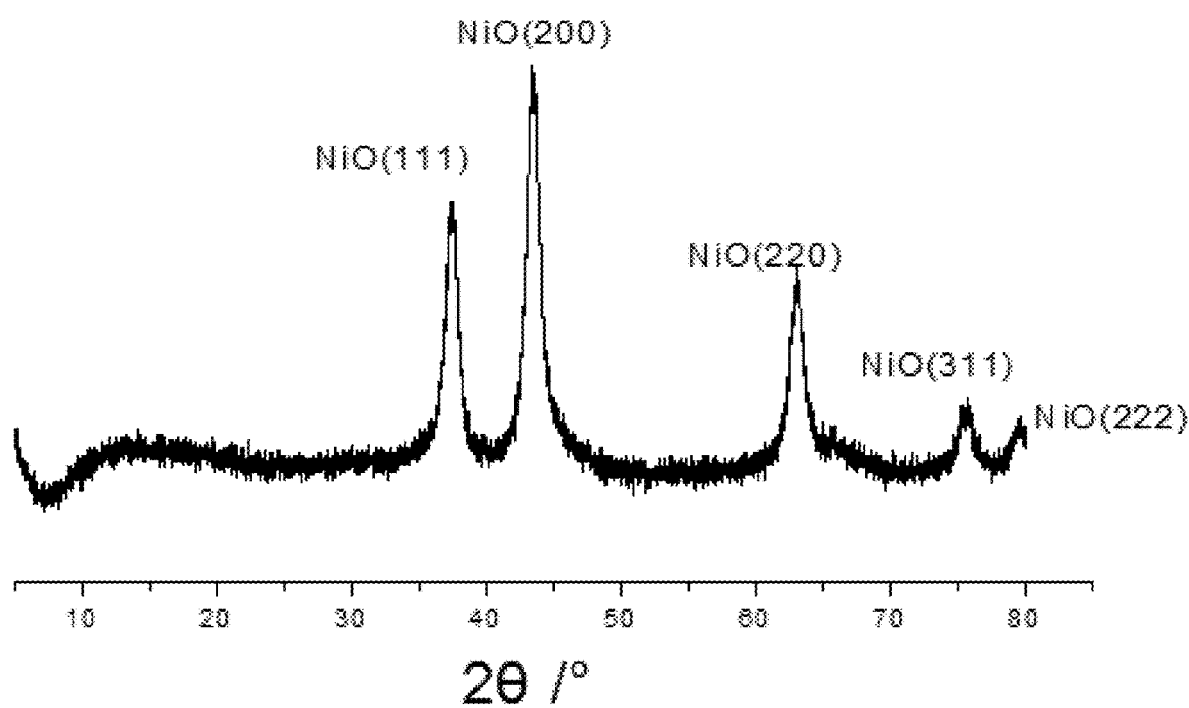
FIG. 1 is an X-ray diffraction pattern of the nanocomposite of Example 1.

The description below provides various embodiments, or examples, in order to enable those skilled in the art to practice the invention with reference to the description herein. These are, of course, merely examples and are not intended to be limiting. The endpoints of the ranges and any values disclosed in the present application are not limited to the precise range or value, but should be understood to encompass values close to these ranges or values. For numerical ranges, combinations of values between the endpoints of each of the ranges, between the endpoints of each of the ranges and individual values, and between individual values can result in one or more new numerical ranges, and such new numerical ranges should be considered as being specifically disclosed herein.

Any terms not directly defined herein should be understood to have the meanings associated with them as commonly understood in the art of the present invention. The following terms as used throughout this specification, unless otherwise indicated, shall be understood to have the following meanings.

The term "core-shell structure" in the present invention refers to a core-shell structure having a shell of an outer film which is a graphitized carbon film and an inner core comprising nickel oxide and alumina nanoparticles. The composite material formed from coating the nickel oxide and the alumina nano particles with the graphitized carbon film is spherical or spheroidal.

The term "graphitized carbon film" refers to a thin film structure composed mainly of graphitized carbon.

The term "carbon element content determined by X-ray photoelectron spectroscopy" or the like refers to a relative content of carbon elements on the surface of a material measured by quantitative elemental analysis using an X-ray photoelectron spectrometer as an analysis tool.

The term "carbon element content determined by elemental analysis" refers to a relative content of total carbon elements of a material measured by elemental quantitative analysis using an elemental analyzer as an analysis tool.

When referring to the amount/content of components in the nanocomposite, the content is an amount/content by weight based on the total weight of the nanocomposite, unless otherwise specified.

The first aspect of the invention provides a carbon-coated nickel-aluminum nanocomposite, which comprises a core-shell structure with an outer film as shell and an inner core, wherein the outer film is a graphitized carbon film, and the inner core comprises nickel oxide and alumina, with a nickel oxide content of 59%-80%, an alumina content of 19%-40%, and a carbon content of not more than 1%, based on the total weight of the nanocomposite.

In some embodiments, the nanocomposite of the present invention has a nickel oxide content of 69% to 79%, an alumina content of 20% to 30%, and a carbon content of 0.3% to 1%. In some embodiments, the carbon content is preferably not more than 0.95%, or not more than 0.90%.

According to the invention, the carbon-coated nickel-aluminum nanocomposite has a core-shell structure comprising an outer film layer and an inner core, wherein the outer film layer is mainly composed of a graphitized carbon film, and the inner core comprises nickel oxide and alumina. The graphitized carbon film is a thin film structure mainly composed of graphitized carbon, which is coated on the surfaces of nickel oxide and alumina nano particles. The inventors of the invention have unexpectedly discovered that the core-shell structure with the outer layer coated with the graphitized carbon film, although with a relatively low carbon content in the film layer, greatly improves the performance of the whole material, particularly the catalytic performance. Specifically, the core-shell structure can not only generate a certain confining effect, effectively avoid the aggregation and growth of nickel oxide and alumina nano particles in the inner core, and ensure that the catalytic activity of the composite material is stable, but also can synergistically increase the catalytic activity of the whole composite material, and obviously improve the catalytic activity compared with the nickel-aluminum material which is not coated with the carbon film.

Without being limited by any known theory, it is believed that in the core-shell structure of the present invention, the graphitized carbon film substantially encapsulate the core. In one embodiment, the "substantial(ly)" encapsulating means that at least 70%, or at least 80%, of the outer surface area of the inner core is covered by the graphitized carbon film.

According to one embodiment of the present invention, in the nanocomposite, the weight ratio of the carbon element content determined by X-ray photoelectron spectroscopy to the carbon element content determined by elemental analysis (which may be simply referred to as a carbon element content ratio determined by two methods) is not less than 10. In some embodiments, the carbon element content ratio determined by the two methods is not less than 15, or not less than 20. In some embodiments, the carbon element content ratio determined by two methods is not more than 45. As mentioned above, the carbon element content determined by X-ray photoelectron spectroscopy refers to a relative content of carbon elements on the surface of a material measured by quantitative elemental analysis using an X-ray photoelectron spectrometer as an analysis tool. The carbon element content determined in the elemental analysis refers to a relative content of total carbon elements of a material measured by elemental quantitative analysis using an elemental analyzer as an analysis tool. When the ratio of the carbon element content determined by X-ray photoelectron spectroscopy to the carbon element content determined by element analysis is relatively larger, most of carbon in the whole nanocomposite is concentrated on the surface of the material to form a carbon film layer, so as to form the core-shell structure.

In some embodiments, the nanocomposite of the present invention has a Raman spectrum with a ratio of the intensity of the G peak near 1580 $cm^{-1}$ to the intensity of the D peak near 1320 $cm^{-1}$ of greater than or equal to 2. In some embodiments, the ratio of the G peak intensity to the D peak intensity is not more than 3. As known to those skilled in the art, the D peak and the G peak are both Raman characteristic peaks of the C atom crystal, where the D peak represents a defect of the carbon atom lattice, while the G peak represents in-plane stretching vibration for the $sp^2$ hybridization of C atom. It is understood that a relatively larger ratio of G peak intensity to D peak intensity indicates that more graphitic carbon atoms are present in the nanocomposite than amorphous carbon atoms. That is, carbon element in the nanocomposite of the present invention exists mainly in the form of graphitic carbon. The graphitic carbon has better oxidation resistance, and can increase the catalytic activity by cooperating with the core nano-particles, thereby improving the performance of the whole composite material.

In some embodiments, the aforementioned core-shell structure has a particle size of generally 2 nm to 100 nm, preferably 5 nm to 80 nm.

In some embodiments, the core of the nanocomposite of the present invention may also comprise an alkali metal oxide to enhance the performance of the material, depending on the requirements of the actual application, wherein the nanocomposite comprises alkali metal oxide in an amount of not more than 5% by weight, preferably not more than 2.5% by weight.

The second aspect of the present invention provides a process for preparing the carbon-coated nickel-aluminum nanocomposite, comprising the steps of:

preparing a nickel-aluminum precursor; carrying out a heating treatment on the nickel-aluminum precursor, and carrying out a vapor deposition by using a lower alkane as a carbon source gas; and carrying out oxygen treatment on the product obtained after the vapor deposition, to provide the nanocomposite.

For the processes of catalytically combusting volatile organic compounds provided herein, in some embodiments, the volatile organic compounds are one or more selected from the group consisting of hydrocarbons having 1-4 carbon atoms. For example, n-butane, n-propane, ethane, and methane are useful.

In some embodiments, the oxidation reaction comprises catalytic combustion by contacting a mixture gas containing volatile organic compounds and a standard gas with a catalyst, wherein the standard gas contains oxygen, and the balance gas thereof may be an inert gas such as nitrogen or argon, and wherein the mixed gas comprises 0.01-2 vol % of the volatile organic compounds and 5-20 vol % of oxygen.

In some embodiments, the oxidation reaction is carried out at a space velocity of 1000-5000 ml reaction gas/(hour g catalyst). The high reaction space velocity allowed by the invention shows that the catalyst of the invention has high activity and large device processing capacity when the reaction is applied.

In some embodiments, the oxidation reaction is carried out at a temperature of from 300° C. to 450° C., preferably from 350° C. to 400° C. This indicates that the catalytic oxidation reaction can be well performed at a low temperature by using the catalyst of the present invention.

According to the present invention, as described above, industrial waste gas often contains Volatile Organic Compounds (VOCs), which have been one of the main causes of photochemical smog, and are deemed together with nitrogen oxides, inhalable particles, etc. as important pollutants for controlling atmospheric quality, and in addition, they have high toxicity, carcinogenic hazards, etc., so that catalytic oxidation materials with excellent performance are urgently required for remediation.

The invention uses a novel catalyst to catalyze and combust VOCs, which shows excellent catalytic activity and stability at low temperature. The catalyst is a core-shell structure comprising an outer film layer and an inner core layer, wherein the outer film layer is mainly composed of a graphitized carbon film, and the graphitized carbon film is a thin film structure mainly composed of graphitized carbon which covers the surfaces of nickel oxide and alumina. The inventors of the invention have unexpectedly discovered that the core-shell structure with the outer layer coated with the graphitized carbon film, although with a relatively low carbon content in the film layer, greatly improves the performance of the whole material, particularly the catalytic performance. Specifically, the core-shell structure can not only generate a certain confining effect, effectively avoid the aggregation and growth of nickel oxide and alumina nano particles in the inner core, and ensure that the catalytic activity of the composite material is stable, but also can synergistically increase the catalytic activity of the whole composite material, and obviously improve the catalytic activity compared with the nickel-aluminum material which is not coated with the carbon film.

The process for preparing the carbon-coated nickel-aluminum nanocomposite comprises the steps of:

preparing a nickel-aluminum precursor; carrying out a heating treatment on the nickel-aluminum precursor, and carrying out a vapor deposition by using a lower alkane as a carbon source gas; and carrying out oxygen treatment on the product obtained after the vapor deposition, to provide the carbon-coated nanocomposite.

According to the preparation process provided by the invention, a nickel-aluminum precursor is prepared, and then a graphite shell is wrapped on the outer surface of the nickel-aluminum core by vapor deposition. The nickel-aluminum precursor prepared by the invention generally has a hydrotalcite crystal structure, and can be prepared by various ways by those skilled in the art, such as coprecipitation and/or hydrothermal crystallization.

Specifically, the nickel-aluminum precursor may be prepared by, but not limited to, the following process.

According to a specific embodiment of the present invention, the nickel-aluminum precursor is prepared by a coprecipitation process, comprising the steps of: simultaneously dropwise adding an alkaline solution and an aqueous solution containing trivalent aluminum salt and divalent nickel salt into water for precipitation treatment, so that the trivalent aluminum salt and the divalent nickel salt generate a coprecipitate; and aging the coprecipitate. The feeding amount of the aqueous solution containing the trivalent aluminum salt and the divalent nickel salt can be controlled depending on the nickel/aluminum content in the target carbon-coated nickel-aluminum composite, and the addition amount of the alkaline solution is so controlled that the trivalent aluminum salt and the divalent nickel salt are completely precipitated. The simultaneous addition of the alkali solution, the trivalent aluminum salt and the divalent nickel salt to the water can improve the dispersion effect of the alkali solution, the aluminum salt and the nickel salt during the initial dropwise addition. In addition, the trivalent aluminum salt and the divalent nickel salt are not particularly limited in the present invention, as long as they are soluble in water; and the base in the alkaline solution is not particularly limited, as long as they are capable of precipitating the trivalent aluminum salt and divalent nickel salt. For example, the trivalent aluminum salt may comprise aluminum nitrate and/or aluminum chloride, the divalent nickel salt may comprise nickel nitrate and/or nickel chloride, and the molar ratio of aluminum in the trivalent aluminum salt to nickel in the divalent nickel salt may be 1:(2-4), where the trivalent aluminum salt may be used at a molar concentration of 0.3-0.6 mol/1. The alkaline solution can be an aqueous solution containing sodium hydroxide and sodium carbonate, with a concentration of sodium hydroxidealkaline solution of 0.2-4 mol/L, and a concentration of sodium carbonate of 0.1-2 mol/L in the alkaline solution. The molar ratio of sodium hydroxide to the total moles of aluminum and nickel in the trivalent aluminum salt and the divalent nickel salt can be (2-4): 1, and the molar ratio of sodium carbonate to the total moles of aluminum and nickel in the trivalent aluminum salt and the divalent nickel salt can be (0.5-2):1.

According to the invention, the precipitation treatment refers to a process of generating a precipitate from a trivalent aluminum salt and a divalent nickel salt by using an alkali solution, wherein the alkali solution can be mixed with the trivalent aluminum salt and the divalent nickel salt in various ways such as dripping, pumping or pouring. The aging treatment refers to further reacting the precipitate generated by the precipitation treatment, to provide a nickel-aluminum hydrotalcite crystal. The steps of the precipitation treatment and the aging treatment is not particularly limited by present invention, as long as a nickel-aluminum precursor is obtained. For example, the treatment may be operated under conditions of: a temperature of from room temperature to less than 100° C., preferably from 40° C. to less than 100° C., to increase the speed of the precipitation process. After the dropping is started, the nickel ions and the aluminum ions are controlled to be precipitated under the conditions including a pH value of more than 7, preferably between 8 and 9, for which the specific operation can comprise: controlling the pH value of the aqueous solution to be between 8 and 9 through the dropping speed of the alkaline solution, and accelerating the dropping speed of the alkaline solution if a pH value of lower than 8 is desired, while slowing down the dropping speed of the alkaline solution if a pH value of higher than 9 is desired. The aging treatment may be operated at a temperature of from 40° C. to less than 100° C. for 2 to 72 hours, preferably 6 to 72 hours, more preferably 24 to 48 hours. The nickel-aluminum hydrotalcite crystal obtained by the aging treatment can be further washed to be neutral and dried, to provide a nickel-aluminum precursor.

According to one embodiment of the invention, the temperature-rising heat treatment comprises raising the temperature of the nickel-aluminum precursor to 500-900° C. in the presence of a protective gas, wherein the protective gas is nitrogen and/or argon, with a flow rate of the protective gas of 10-500 ml/(min g nickel-aluminum precursor), and a temperature-rising speed of 1-5° C./min. The protective gas is used as a carrier gas in the temperature-rising process for the nickel-aluminum precursor, so that the nickel-aluminum precursor is prevented from contacting air to cause danger during the reduction reaction and carbon deposition reaction, and the graphite shell is prevented from contacting air to be oxidized at high temperature after being coated with the graphite shell.

In some embodiments, the graphitic carbon shell is formed on the surface of the material by vapor deposition. The vapor deposition is carried out at a temperature of 750-900° C., preferably 780-850° C., for 5-240 min, preferably 60-120 min. The carbon source gas is preferably methane or ethane, which is used at a flow rate of 10 to 500 ml/(min g nickel-aluminum precursor), preferably 30 to 100 ml/(min g nickel-aluminum precursor), and more preferably 30 to 60 ml/(min. g nickel-aluminum precursor).

According to the invention, after the nickel-aluminum precursor is obtained, the nickel-aluminum precursor subjected to the temperature-rising heat treatment is further contacted with hydrogen for a reduction treatment. The reduction treatment has the functions of: on the one hand, the nickel-aluminum precursor existing in the form of hydroxide (hydrotalcite) being further dehydrated, and on the other hand, the generated nickel-aluminum oxide being reduced to generate elemental nickel as an active center. The hydrogen reduction treatment may be operated at a temperature of 500-900° C., for 120-480 minutes, with a hydrogen flow rate of 30-50 ml/(min g nickel-aluminum precursor).

According to the invention, after the nickel-aluminum precursor is obtained, the nickel-aluminum precursor subjected to the temperature-rising heat treatment is further contacted with hydrogen for a reduction treatment. The reduction treatment has the functions of: on the one hand, the nickel-aluminum precursor existing in the form of hydroxide (hydrotalcite) being further dehydrated to generate nickel-aluminum oxide, and on the other hand, the generated nickel-aluminum oxide being reduced to generate elemental nickel as an active center, so that alumina and nickel oxide are combined to form an amorphous structure, and the proportion of carboxyl oxygen in the graphite shell can be reduced. The hydrogen reduction treatment may be operated at a temperature of 500-900° C., for 120-480 minutes, with a hydrogen flow rate of 30-50 ml/(min g nickel-aluminum precursor). The conditions of the hydrogen reduction treatment may comprise: a temperature of 500-900° C., the time is 120-480 minutes, and the hydrogen flow is 30-50 ml/(min. g nickel-aluminum precursor).

According to one embodiment of the invention, the process further comprises mixing a nickel-aluminum precursor and a salt solution of an alkali metal for coprecipitation reaction, and then carrying out a temperature-rising heat treatment on the obtained precipitate, wherein the molar ratio of the alkali metal to nickel is not more than 0.2. The inventors of the present invention have found that by the above-described coprecipitation reaction with a small amount of alkali metal before the temperature-rising heat treatment, the composite can show further improved catalytic activity when being used as a catalyst to catalyze an acidic oxide such as $N_2O$.

In some embodiments, the invention further comprises carrying out oxygen treatment on the product obtained after the vapor deposition, by which a specific structure of graphitized carbon film is formed.

In some embodiments, the oxygen treatment comprises introducing a standard gas into the product obtained after the vapor deposition and heating, wherein the standard gas contains oxygen and a balance gas, with a concentration of the oxygen of 10%-40 vol %, optionally 10%-30 vol %. The balance gas may be an inert gas such as nitrogen or argon, but the present invention is not limited thereto.

In some embodiments, the oxygen treatment is carried at a temperature of from 200° C. to 500° C., preferably from 300° C. to 400° C., for 0.5 h-10 h, after which the carbon-coated nickel-aluminum nanocomposite according to the present invention can be obtained.

Those skilled in the art can understand that, carbon will undergo an oxidation reaction at high temperatures upon contact with oxygen to form a gas, and it will be appreciated that the product after vapor deposition forms a nanocomposite having a graphitized carbon shell coating a nickel aluminum core, with a carbon content of about 3%-8%. After the product is treated with oxygen, most of the carbon in the material is lost with the oxidation reaction. However, the inventors of the present invention have unexpectedly found that for the oxygen treated material, while most of the carbon is burnt off, not only the nickel and aluminum of the core is oxidized, but also a small portion of the carbon is remained. As mentioned above, XPS and Raman spectrum detection analysis prove that, a part of carbon is a graphitized carbon film layer coated on the surfaces of nickel oxide and alumina, which carbon film layer further has a plurality of excellent properties, so that the nanocomposite has great application potential in catalytic materials, energy storage materials and electromagnetic materials.

According to one embodiment of the present invention, in the X-ray diffraction pattern (XRD), only the characteristic peaks of nickel oxide are present without characteristic peaks of elemental nickel, indicating that the nickel of the core is completely oxidized, so that the core of the resulting nanocomposite consists of nickel oxide and alumina. According to the present invention, the nanocomposite can have a content of elemental nickel of not more than 1%, not more than 0.5%, not more than 0.1%, or not more than 0.01%.

Those skilled in the art can understand that, carbon will undergo an oxidation reaction at high temperatures upon contact with oxygen to form a gas, and it will be appreciated that the product after vapor deposition forms a nanocomposite having a graphitized carbon shell coating a nickel aluminum core, with a carbon content of about 3%-8%. After the product is treated with oxygen, most of the carbon in the material is lost with the oxidation reaction. However, the inventors of the present invention have unexpectedly found that for the oxygen treated material, while most of the carbon is burnt off, not only the nickel and aluminum of the core is oxidized, but also a small portion of the carbon is remained. As mentioned above, XPS and Raman spectrum detection analysis prove that, a part of carbon is a graphitized carbon film layer coated on the surfaces of nickel oxide and alumina, which carbon film layer further has a plurality of excellent properties, so that the nanocomposite has great application potential in catalytic materials, energy storage materials and electromagnetic materials, especially catalytic activity. The nanocomposite is useful for catalytic combustion of volatile organic compounds, showing excellent catalytic activity and stability, which can catalyze the oxidation combustion of VOCs at a low temperature with high efficiency, is beneficial to solving the problem of purification of VOCs, and has important significance for reducing air pollution.

The invention also provides the use of the above nanocomposite as a catalyst for decomposing nitrous oxide, comprising: contacting the catalyst with nitrous oxide for a catalytic decomposition reaction, to generate nitrogen and oxygen. Specifically, a gas containing dinitrogen monoxide is introduced into a reactor in which the catalyst is installed to perform a catalytic decomposition reaction.

In some embodiments, the catalytic decomposition reaction is carried out at a temperature of 300° C.-400° C., preferably 350° C.-380° C. The catalytic decomposition reaction is carried out at a space velocity of 1000-3000 ml reaction gas/(hour g catalyst). The high reaction space velocity allowed by the invention shows that the catalyst of the invention has high activity and large processing capacity for device when the reaction is applied.

According to the present invention, as described above, the catalysts for decomposition of $N_2O$ which have been currently studied and reported are mainly noble metal catalysts, ion-exchanged molecular sieve catalysts and transition metal oxide catalysts. Although the noble metal catalyst has a low decomposition temperature, the noble metal catalyst is expensive and not suitable for large-scale industrial production. Other molecular sieve catalysts and transition metal oxide catalysts have a high-efficiency decomposition temperature of 450-550° C., and the high temperature required by the reaction greatly increases the industrial cost. In addition, the decomposition of nitrous oxide generates oxygen, which tends to deactivate the catalyst.

However, the inventors of the present invention have found that using the carbon-coated nickel-aluminum nanocomposite of the present invention as a catalyst can effectively decompose nitrous oxide into nitrogen and oxygen, and exhibits excellent catalytic activity stability in the reaction. In addition, when the existing catalyst is used for catalyzing the decomposition of nitrous oxide, the nitrous oxide obtained in high-concentration from industrial production generally needs to be diluted to be about 0.5%-2%, but the catalyst of the present invention can be directly used for decomposition to achieve a high decomposition rate without being diluted. Namely, the nitrous oxide can be subjected to catalytic decomposition reaction when the volume concentration is 30-40%, with a decomposition rate up to 99% or higher, so that the industrial cost is greatly reduced, and the process has a good industrial application prospect.

EXAMPLES

The invention will now be further illustrated by the following Examples, but is not limited thereto. Unless otherwise specified, all reagents used in the invention are analytically pure.

According to the invention, elements on the surface of a material were detected by an X-ray photoelectron spectrum analyzer (XPS). The X-ray photoelectron spectrum analyzer used was an ESCALab220i-XL ray photoelectron analyzer produced by VG Scientific company which was provided with Avantage V5.926 software, and the analysis and test conditions of the X-ray photoelectron spectrum analyzer comprised: an excitation source of a monochromatized AlKαX-ray with a power of 330 W and a base vacuum of $3 \times 10^{-9}$ mbar for the analytical test.

The analysis of carbon (C) element is carried out on an Elementar Micro Cube element analyzer which was mainly used for analyzing four elements of carbon (C), hydrogen (H), oxygen (O) and nitrogen (N), with specific operation method and conditions of: weighing 1-2 mg of a sample in a tin cup, placing the sample in an automatic sample feeding disc, feeding the sample into a combustion tube through a ball valve for combustion, wherein the combustion temperature was 1000° C. (in order to avoid interference by atmosphere during sample feeding, helium gas was adopted for purge), and then reducing the combusted gas by using a reducing copper to form nitrogen, carbon dioxide and water. The mixed gas was separated by three desorption columns and sequentially fed into a TCD detector for detection. The oxygen element is analyzed by converting oxygen in the sample into CO under the action of a carbon catalyst through pyrolysis, and then detecting the CO with TCD. As the composite of the present invention contained only carbon and metal oxide, the total content of the metal oxide could be known from the content of the carbon element.

The ratio of the different metal oxides was measured by an X-ray fluorescence spectrometer (XRF), and the content of the different metal oxides in the composite was calculated according to the known content of carbon element. The X-ray fluorescence spectrum analyzer (XRF) used in the invention was a Rigaku 3013 X-ray fluorescence spectrometer, with analysis and test conditions of: a scanning time of 100 s and an atmosphere of air.

The Raman detection used in the present invention was a LabRAM HR UV-NIR laser confocal Raman spectrometer produced by HORIBA company, Japan, with laser wavelength of 325 nm.

The high-resolution transmission electron microscope (HRTEM) used by the invention was JEM-2100(HRTEM) (JEOL.), and the test conditions of the high-resolution transmission electron microscope comprised: an acceleration voltage of 200 kV.

The XRD diffractometer used by the invention is an XRD-6000 X-ray powder diffractometer (Shimadzu, Japan), and the XRD test conditions comprised: a Cu target, K α rays (wavelength λ=0.154 nm), a tube voltage of 40 kV, a tube current of 200 mA, and a scanning speed of 10° (2θ)/min.

Example 1

This Example illustrated the preparation of a carbon-coated nickel-aluminum nanocomposite according to the present invention.
(1) 11.64 g (0.04 mol) of nickel nitrate hexahydrate and 7.5 g (0.02 mol) of aluminum nitrate nonahydrate were weighed, and 60 ml of deionized water was added to prepare a mixed salt solution. 5.40 g (0.135 mol) of sodium hydroxide and 5.08 g (0.048 mol) of anhydrous sodium carbonate were added into 120 ml of deionized water to prepare a mixed alkali solution. The two mixed solutions were simultaneously dropwise added, under stirring, into a three-neck flask which was pre-filled with 100 ml deionized water at a constant temperature of 60° C., the precipitate of the trivalent aluminum salt and the divalent nickel salt in the three-neck flask was strictly controlled at pH=8.4 (namely, controlled be between 8.3 and 8.5), continuously stirred at 60° C. after dropwise addition, aged for 30 min at 80° C. for 24 h, centrifugally washed to be neutral, dried for 4 h at 80° C., then mixed with 0.14 g (0.001 mol) of potassium carbonate, added with 150 ml of deionized water, stirred at 60° C. for 10 hours, and dried at 80° C. for 10 hours, to provide a nickel-aluminum precursor coprecipitated with alkali metal.
(2) 1.0 g of the nickel-aluminum precursor obtained in the step (1) was weighed and placed into a ceramic boat, then the ceramic boat was placed into a tubular furnace under a nitrogen protective atmosphere, for a temperature programming at 5° C./min under a nitrogen flow of 100 mL/min, so as to heat to 500° C., followed by introducing 30 mL/min of hydrogen for 180 min, and closing the hydrogen. The temperature was continuously raised to 800° C., 50 mL/min of methane was introduced in at the temperature, for reaction for 60 min. After the reaction was finished, the methane was closed, and the temperature was naturally decreased in a nitrogen atmosphere, to provide a composite coated with a carbon shell after vapor deposition.
(3) the material obtained in the step (2) was placed in the ceramic boat, then the ceramic boat was placed in a constant temperature area of a tube furnace, a standard gas (15% of oxygen and balance gas) was introduced in at a flow rate of 100 mL/min, for a temperature programming at 2° C./min, so as to heat to 350° C., the temperature was kept for 8 hours, then heating was stopped, and was cooled to room temperature under the atmosphere of the standard gas, to provide a black solid, namely the nanocomposite of the present invention.

Figure 2A:
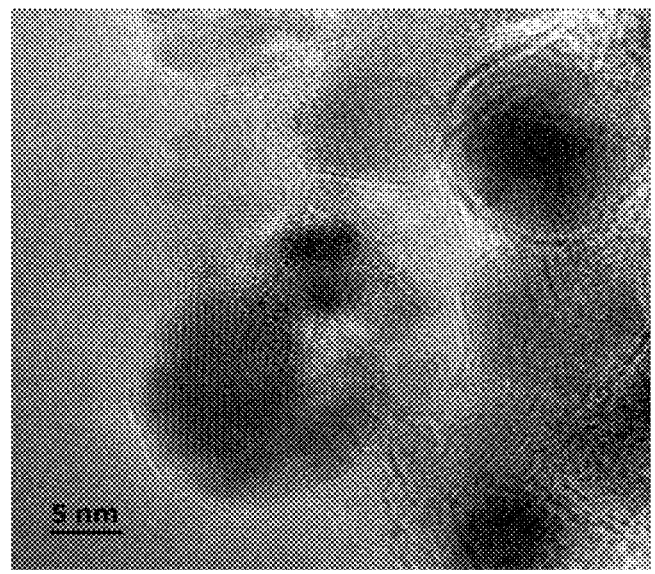
FIGS. 2a and 2b are TEM images of the nanocomposite of Example 1 at different magnifications.
Figure 2B:
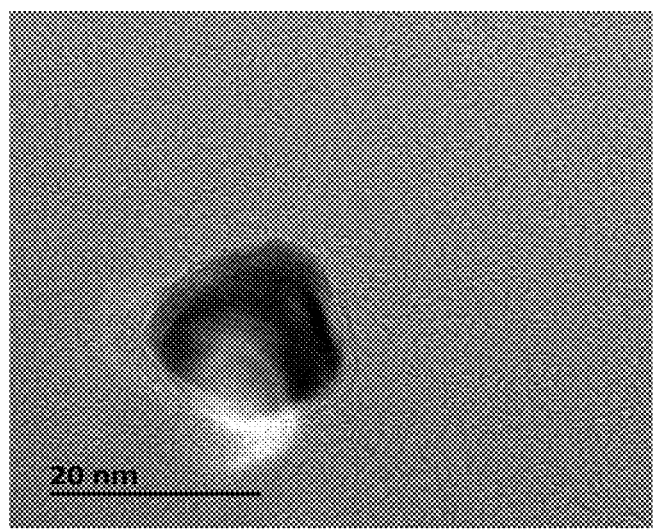

Characterization of Material:

FIG. 1 was an X-ray diffraction (XRD) spectrum of the nanocomposite of Example 1, and it could be seen from FIG. 1 that nickel in the nanocomposite existed as an oxide after a mild oxidation treatment. FIGS. 2a and 2b were Transmission Electron Micrographs (TEM) of the nanocomposite of Example 1 at different magnifications, respectively, from which it could be observed that a carbon layer film was formed on the surface of the material, with a particle size of about 5-20 nm.

Figure 3:
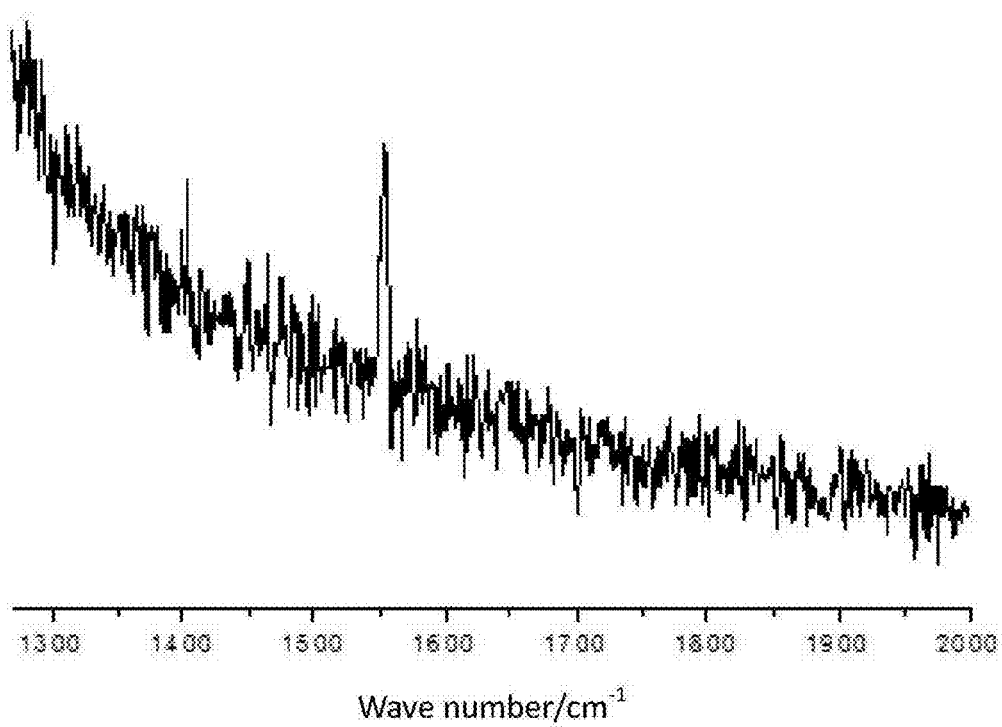
FIG. 3 is a Raman spectrum of the nanocomposite of Example 1.

X-ray fluorescence spectroscopy (XRF) and elemental analysis showed that the nanocomposite contained 0.79 wt % carbon, 77.14 wt % nickel oxide, 20.05 wt % alumina, and 2.02 wt % potassium oxide. X-ray photoelectron spectroscopy (XPS) analysis showed that carbon, oxygen, nickel, aluminum, and potassium were detected as surface layer elements of the nanocomposite; wherein the content ratio of the carbon element to the total carbon element content in the surface layer was 32.7/1. It could be seen that carbon in the nanocomposite was mainly present on the surface of the core-shell structure. FIG. 3 showed a Raman spectrum of the nanocomposite, wherein the ratio of the intensity of the G peak (1580 cm$^{-1}$) to the intensity of the D peak (1320 cm$^{-1}$) was 2.1/1. It could be seen that most of carbon in this material was graphitic carbon.

Example 2

This example illustrated the preparation of a carbon-coated nickel-aluminum nanocomposite according to the present invention.
(1) 11.64 g (0.04 mol) of nickel nitrate hexahydrate and 7.5 g (0.02 mol) of aluminum nitrate nonahydrate were weighed, and 60 ml of deionized water was added to prepare a mixed salt solution. 5.40 g (0.135 mol) of sodium hydroxide and 5.08 g (0.048 mol) of anhydrous sodium carbonate were added into 120 ml of deionized water to prepare a mixed alkali solution. The two mixed solutions were simultaneously dropwise added, under stirring, into a three-neck flask which was pre-filled with 100 ml deionized water at a constant temperature of 60° C., the precipitate of the trivalent aluminum salt and the divalent nickel salt in the three-neck flask was strictly controlled at pH=8 (namely, controlled be between 7.9 and 8.1), continuously stirred at 60° C. after dropwise addition, aged for 30 min at 80° C. for 24 h, centrifugally washed to be neutral, dried at 80° C., to provide a nickel-aluminum precursor coprecipitated with alkali metal.

(2) 1.0 g of the nickel-aluminum precursor obtained in the step (1) was weighed and placed into a ceramic boat, then the ceramic boat was placed into a tubular furnace under a nitrogen protective atmosphere, for a temperature programming at 5° C./min under a nitrogen flow of 100 mL/min, so as to heat to 500° C., followed by introducing 30 mL/min of hydrogen for 240 min, and closing the hydrogen. The temperature was continuously raised to 800° C., 50 mL/min of methane was introduced in at the temperature, for reaction for 60 min. After the reaction was finished, the methane was closed, and the temperature was naturally decreased in a nitrogen atmosphere, to provide a composite coated with a carbon shell after vapor deposition.

(3) the material obtained in the step (2) was placed in the ceramic boat, then the ceramic boat was placed in a constant temperature area of a tube furnace, a standard gas (15% of oxygen and balance gas) was introduced in at a flow rate of 100 mL/min, for a temperature programming at 2° C./min, so as to heat to 350° C., the temperature was kept for 10 hours, then heating was stopped, and was cooled to room temperature under the atmosphere of the standard gas, to provide a black solid, namely the nanocomposite of the present invention.

Figure 4:
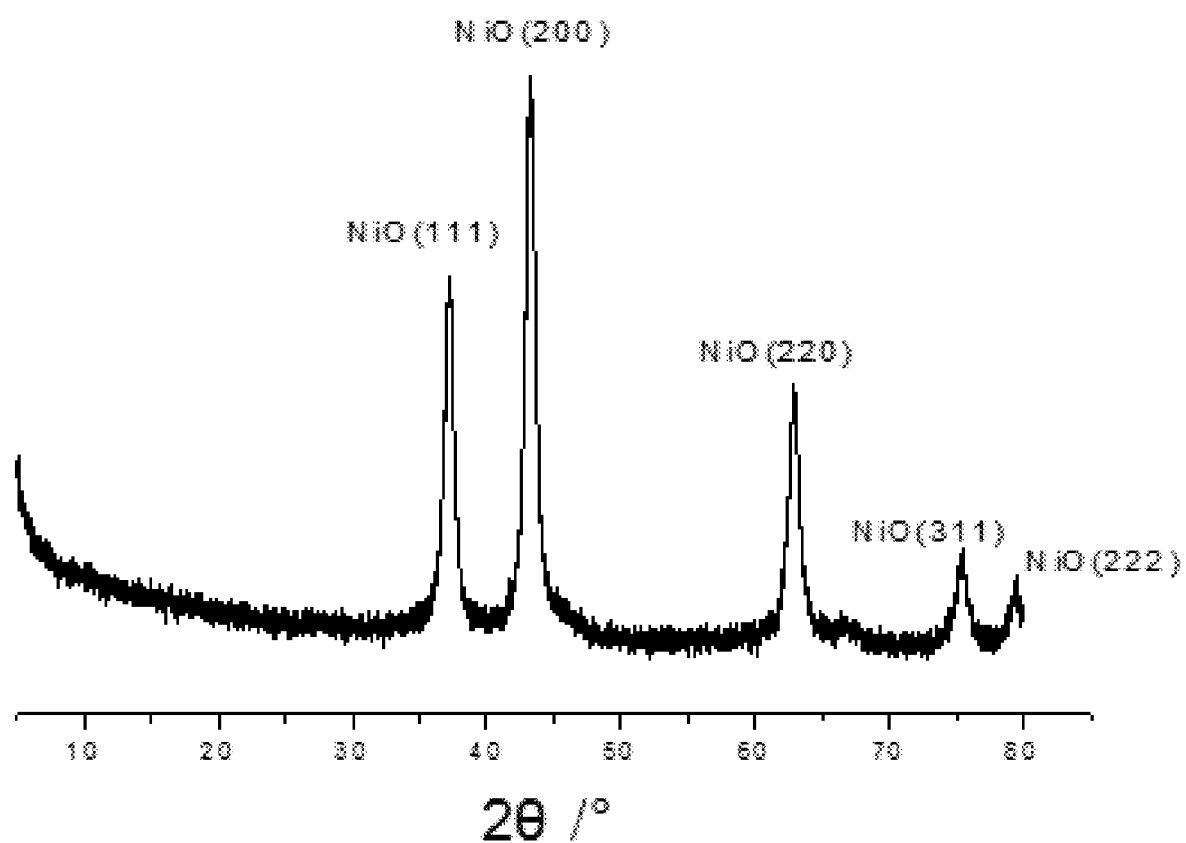
FIG. 4 is an X-ray diffraction pattern of the nanocomposite of Example 2.
Figure 5A:
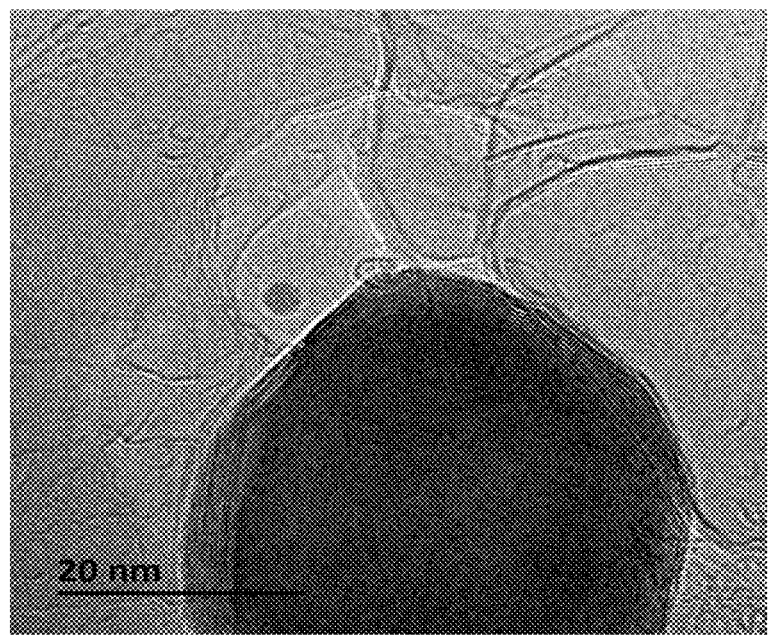
FIGS. 5a and 5b are TEM images of the nanocomposite of Example 2 at different magnifications.
Figure 5B:
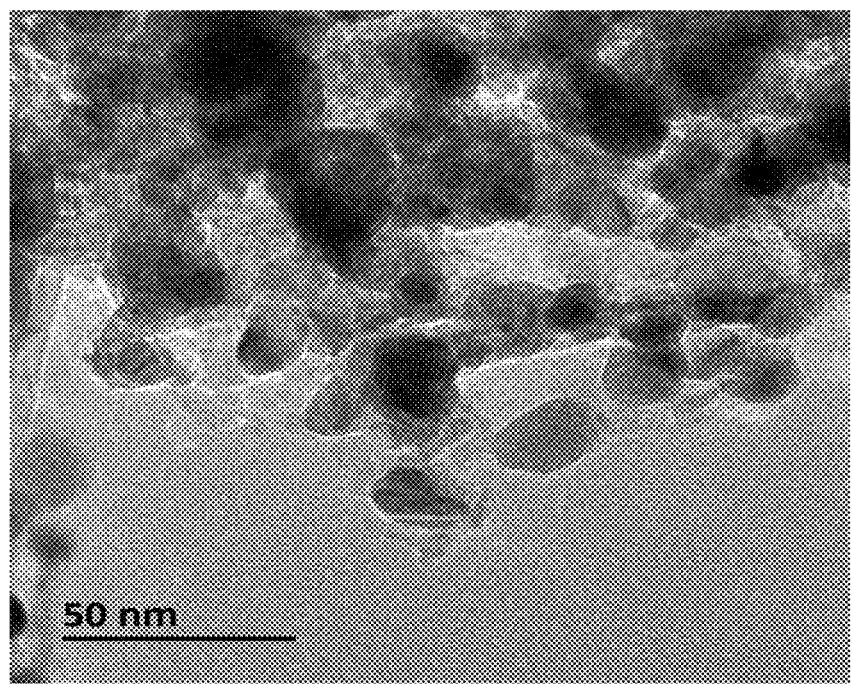

Characterization of Material:

FIG. 4 was an X-ray diffraction (XRD) spectrum of the nanocomposite of Example 2, and it could be seen from FIG. 4 that nickel in the nanocomposite existed as an oxide after a mild oxidation treatment. FIGS. 5a and 5b were Transmission Electron Micrographs (TEM) of the nanocomposite of Example 2 at different magnifications, respectively, from which it could be observed that a carbon layer film was formed on the surface of the material, with a particle size of about 5-20 nm.

Figure 6:
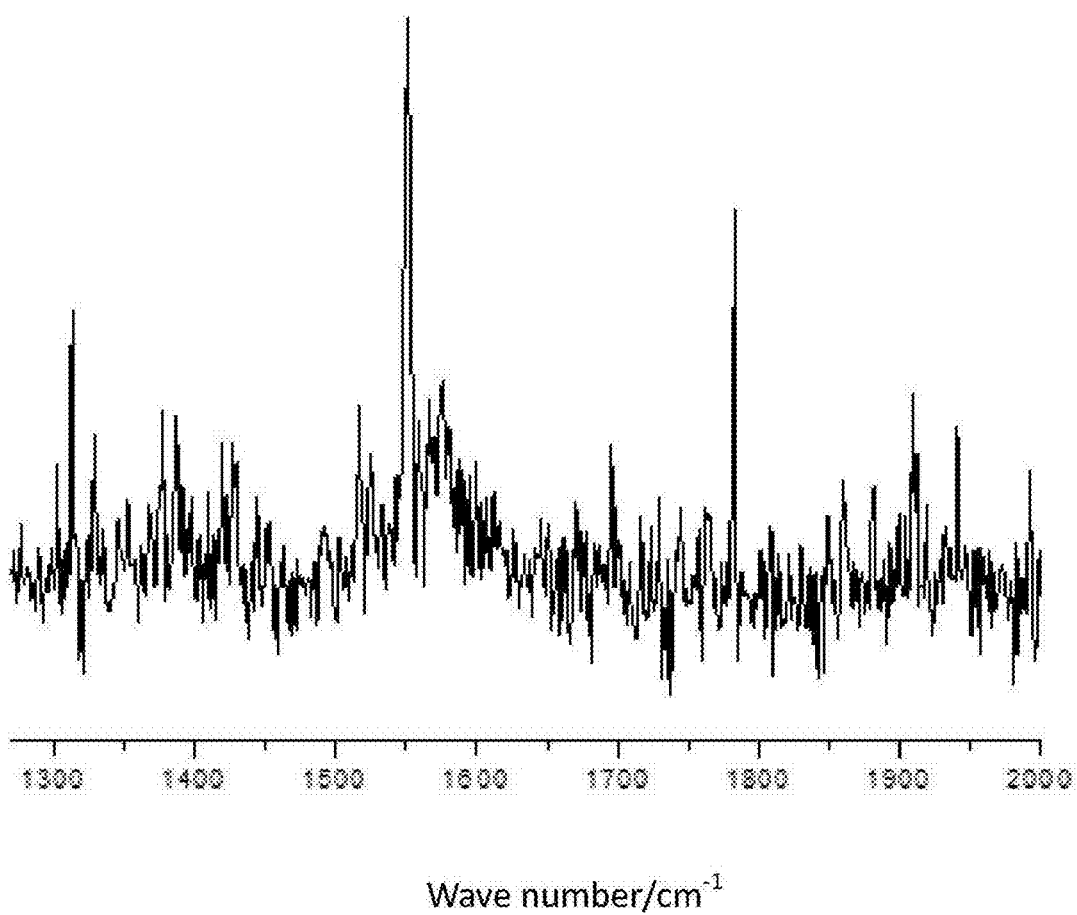
FIG. 6 is a Raman spectrum of the nanocomposite of Example 2.

X-ray fluorescence spectroscopy (XRF) and elemental analysis showed that the nanocomposite contained 0.95 wt % carbon, 77.14 wt % nickel oxide, and 21.64 wt % alumina. X-ray photoelectron spectroscopy (XPS) analysis showed that carbon, oxygen, nickel, aluminum, and potassium were detected as surface layer elements of the nanocomposite; wherein the content ratio of the carbon element to the total carbon element content in the surface layer was 43/1. It could be seen that carbon in the nanocomposite was mainly present on the surface of the core-shell structure. FIG. 6 showed a Raman spectrum of the nanocomposite, wherein the ratio of the intensity of the G peak (1580 $cm^{-1}$) to the intensity of the D peak (1320 $cm^{-1}$) was 2.4/1. It could be seen that most of carbon in this material was graphitic carbon.

Comparative Example 1

The nickel-aluminum precursor obtained in the step (1) of Example 1 was weighed and placed into a ceramic boat, then the ceramic boat was placed into a tubular furnace under a nitrogen protective atmosphere, for a temperature programming at 5° C./min under a nitrogen flow of 100 mL/min, so as to heat to 500° C., followed by introducing 30 mL/min of hydrogen for 180 min, closing the hydrogen; and naturally cooling under the hydrogen atmosphere, to provide an intermediate product.

The intermediate product was placed in the ceramic boat, then the ceramic boat was placed in a constant temperature area of a tube furnace, a standard gas (15% of oxygen and balance gas) was introduced in at a flow rate of 100 mL/min, for a temperature programming at 2° C./min, so as to heat to 350° C., the temperature was kept for 3 hours, then heating was stopped, and was cooled to room temperature under the atmosphere of the standard gas, to provide a nickel-aluminium composite oxide without a carbon film coating.

X-ray fluorescence spectroscopy (XRF) and elemental analysis showed that the material contained 76.94 wt % nickel oxide, 20.87 wt % alumina, and 2.19 wt % potassium oxide.

Comparative Example 2

The nickel-aluminum precursor obtained in the step (1) of Example 1 was weighed and placed into a ceramic boat, then the ceramic boat was placed into a tubular furnace under a nitrogen protective atmosphere, for a temperature programming at 5° C./min under a nitrogen flow of 100 mL/min, so as to heat to 500° C., followed by introducing 30 mL/min of hydrogen for 240 min, and closing the hydrogen; and naturally cooling under the hydrogen atmosphere, to provide an intermediate product.

The intermediate product was placed in the ceramic boat, then the ceramic boat was placed in a constant temperature area of a tube furnace, a standard gas (15% of oxygen and balance gas) was introduced in at a flow rate of 100 mL/min, for a temperature programming at 2° C./min, so as to heat to 350° C., the temperature was kept for 3 hours, then heating was stopped, and was cooled to room temperature under the atmosphere of the standard gas, to provide a nickel-aluminium composite without a carbon film coating.

X-ray fluorescence spectroscopy (XRF) and elemental analysis showed that the material contained 77.96 wt % nickel oxide and 22.04 wt % alumina.

Application Example 1

This application Example illustrated the reaction of catalyzing the decomposition of nitrous oxide using the nanocomposite of Example 1 as a catalyst.

0.5 g of the catalyst was placed in a continuous flow fixed bed reactor, wherein the reaction gas comprised 38.0% of $N_2O$ and nitrogen as the balance gas, and the flow rate of the reaction gas was 15 ml/min. The activity evaluation was made at temperatures ranging from 300° C. to 500° C., and the conversions of $N_2O$ by catalytic decomposition of the catalyst at different temperatures were shown in Table 1.

Application Example 2

A decomposition was carried out using the process according to application Example 1, except that the nanocomposite of Example 2 was used as the catalyst, and the results were shown in Table 1.

Comparative Application Example 1

A decomposition reaction was carried out using the process of application Example 1, except that the material of comparative Example 1 was used as the catalyst and the results were shown in Table 1.

Comparative Application Example 2

A decomposition reaction was carried out using the process of application Example 1, except that the material of comparative Example 2 was used as the catalyst and the results were shown in Table 1.

TABLE 1

| Catalyst | conversion of N₂O (%) | | | | |
|---|---|---|---|---|---|
|  | 300° C. | 360° C. | 380° C. | 430° C. | 465° C. |
| Example 1 | 41.6 | 99.4 | 100 | 100 | 100 |
| Example 2 | 19.2 | 75.1 | 99.1 | 100 | 100 |
| Comparative Example 1 | 7.4 | 53.4 | 76.4 | 99.6 | 100 |
| Comparative Example 2 | 2.1 | 39.8 | 67.6 | 91.3 | 99.2 |

From Table 1 above, it could be seen that the carbon-coated nickel-aluminum nanocomposite prepared by the process of the present invention had better catalytic performance for decomposition of $N_2O$ compared with uncoated nickel-aluminum oxide, which could decompose $N_2O$ with high efficiency at a relatively low temperature range, whereas the materials of comparative Examples 1 and 2 required at least 430° C. or 465° C. to achieve a $N_2O$ conversion rate of more than 99%, and to achieve a relatively complete decomposition. In addition, the composite contained a certain content of alkali metal oxide, so that the catalytic performance was improved to a certain extent.

It could be seen that the nanocomposite of the invention had a good catalytic effect on the decomposition of nitrous oxide, could decompose and eliminate $N_2O$ with high efficiency at a low temperature. When being used for treating industrial production waste gas $N_2O$, for example, the elimination of high-concentration $N_2O$ waste gas generated in the production process of adipic acid plants and nitric acid plants, the nanocomposite could greatly reduce the reaction temperature and energy consumption, thereby having good industrial application prospects.

Application Example 3

This application Example illustrated the catalytic combustion of VOCs using the nanocomposite of Example 1 as a catalyst.

0.2 g of the catalyst was placed in a continuous flow fixed bed reactor, wherein the reaction gas comprised 0.5% n-butane, 8% oxygen by volume, and nitrogen as the balance gas, and the flow rate of the reaction gas was 15 ml/min. The activity evaluation was made at temperatures ranging from 300° C. to 500° C., and the conversions of VOCs by catalytic combustion of the catalyst at different temperatures was shown in Table 2.

Application Example 4

A reaction for catalytic combustion of VOCs was carried out using the according to of application Example 3, except that the nanocomposite of Example 2 was used as a catalyst, and the results were shown in Table 2.

Comparative Application Example 3

A decomposition reaction was carried out by the process of application Example 3, except that the material of comparative Example 1 was used as a catalyst and the results were shown in Table 2.

Comparative Application Example 4

A decomposition reaction was carried out by the process of application Example 3, except that the material of comparative Example 2 was used as a catalyst and the results were shown in Table 2.

TABLE 2

| Catalyst | Conversion of n-butane (%) | | | | |
|---|---|---|---|---|---|
|  | 300° C. | 350° C. | 400° C. | 450° C. | 500° C. |
| Example 1 | 62.5 | 89.4 | 98.9 | 100 | 100 |
| Example 2 | 74.7 | 96.1 | 100 | 100 | 100 |
| Comparative Example 1 | 19.4 | 36.2 | 61.6 | 80.3 | 94.9 |
| Comparative Example 2 | 30.2 | 59.7 | 78.2 | 92.4 | 100 |

As could be seen from the Table 2 above, in the catalytic combustion evaluation experiment performed by using n-butane as a model molecule, the carbon-coated nickel-aluminum nanocomposite prepared by the process of the invention showed better performance of catalyzing and combusting VOCs compared with nickel-aluminum oxide without being coated with a carbon film, and thus could catalyze effectively n-butane to completely combust to generate carbon dioxide and water at a relatively low temperature, greatly reduced the reaction temperature, reduced the energy consumption, and had good industrial application prospect.

It should be noted by those skilled in the art that the described embodiments of the present invention are merely exemplary and that various other substitutions, alterations, and modifications may be made within the scope of the present invention. Accordingly, the present invention is not limited to the above-described embodiments, but is only limited by the claims.

The invention claimed is:

1. A carbon-coated nickel-aluminum nanocomposite, comprising a core-shell structure with an outer shell and an inner core, wherein the outer shell is a graphitized carbon film, wherein the inner core consists substantially of nickel oxide and alumina, wherein the carbon-coated nickel-aluminum nanocomposite has a nickel oxide content of 59%-80%, an alumina content of 19%-40%, and a carbon content of not more than 1%, and an elemental nickel content in an amount of not more than 1%, based on a total weight of the carbon-coated nickel-aluminum nanocomposite, and wherein the graphitized carbon film is substantially composed of graphitized carbon.

2. The carbon-coated nickel-aluminum nanocomposite according to claim 1, wherein the nickel oxide content is 69%-79%, the alumina content is 20%-30%, and the carbon content is 0.3%-1%.

3. The carbon-coated nickel-aluminum nanocomposite according to claim 1, a weight ratio of a carbon element content determined by X-ray photoelectron spectroscopy to a carbon element content determined by elemental analysis is not less than 10.

4. The carbon-coated nickel-aluminum nanocomposite according to claim 1, having a Raman spectrum with a ratio of an intensity of a G peak located near 1580 $cm^{-1}$ to an intensity of a D peak located near 1320 $cm^{-1}$ of greater than 2.

5. The carbon-coated nickel-aluminum nanocomposite according to claim 1, wherein the core-shell structure has a particle size of 2 nm to 100 nm.

6. The carbon-coated nickel-aluminum nanocomposite according to claim 1, wherein the inner core further comprises an alkali metal oxide in an amount of not more than 5% by weight, relative to the total weight of the carbon-coated nickel-aluminum nanocomposite.

7. The carbon-coated nickel-aluminum nanocomposite according to claim 1, wherein the nanocomposite comprises elemental nickel in an amount of not more than 0.1% based on the total weight of the carbon-coated nickel-aluminum nanocomposite.

8. A process for preparing the carbon-coated nickel-aluminum nanocomposite according to claim 1, comprising the steps of:
preparing a nickel-aluminum precursor;
carrying out a heating treatment on the nickel-aluminum precursor, and carrying out a vapor deposition by using an alkane as a carbon source gas; and
carrying out oxygen treatment on a product obtained after the vapor deposition, to provide the carbon-coated nickel-aluminum nanocomposite.

9. The process according to claim 8, wherein the oxygen treatment comprises introducing a standard gas into the product obtained after the vapor deposition and heating, wherein the standard gas contains 10-40 vol % of oxygen and a balance gas.

10. The process according to claim 8, wherein the oxygen treatment is carried at a temperature of 200° C. to 500° C. for 0.5 h to 10 h.

11. The process according to claim 8, wherein the nickel-aluminum precursor is prepared by coprecipitation and/or hydrothermal crystallization.

12. The process according to claim 8, wherein the nickel-aluminum precursor is prepared using a method comprising:
simultaneously dropwise adding an alkaline solution and an aqueous solution containing trivalent aluminum salt and divalent nickel salt into water for precipitation treatment, so that the trivalent aluminum salt and the divalent nickel salt generate a coprecipitate; and
aging the coprecipitate.

13. The process according to claim 12, wherein the trivalent aluminum salt comprises aluminum nitrate and/or aluminum chloride, the divalent nickel salt comprises nickel nitrate and/or nickel chloride, and the molar ratio of aluminum in the trivalent aluminum salt to nickel in the divalent nickel salt is 1:(2-4);
the alkaline solution is an aqueous solution containing sodium hydroxide and sodium carbonate, with a concentration of sodium hydroxide 0.2-4 mol/L, and a concentration of sodium carbonate of 0.1-2 mol/L in the alkaline solution; and
the molar ratio of sodium hydroxide to the total moles of aluminum and nickel in the trivalent aluminum salt and the divalent nickel salt is (2-4):1, and the molar ratio of sodium carbonate to the total moles of aluminum and nickel in the trivalent aluminum salt and the divalent nickel salt is (0.5-2):1.

14. The process according to claim 12, wherein the precipitation treatment is carried out at a temperature of 40° C. to less than 100° C., and the aging treatment is carried out at a temperature of 40° C. to less than 100° C. for 2 to 48 hours.

15. The process according to claim 8, further comprising contacting the heat-treated nickel-aluminum precursor with hydrogen to perform reduction treatment, at a temperature of 500-900° C., for 120-480 min, with a hydrogen flow rate of 30-50 ml/(min·g nickel-aluminum precursor).

16. The process according to claim 8, further comprising mixing the nickel-aluminum precursor and a salt solution of an alkali metal for coprecipitation reaction, and then carrying out a heat treatment on a resulting precipitate, wherein the molar ratio of the alkali metal to nickel is not more than 0.2.

17. The process according to claim 8, wherein the heat treatment comprises raising the temperature of the nickel-aluminum precursor to 500-900° C. in the presence of a protective gas, wherein the protective gas is nitrogen and/or argon, with a flow rate of the protective gas of 10-500 ml/(min·g nickel-aluminum precursor), and a temperature-rising rate of 1-5° C./min;
the vapor deposition is carried out at a temperature of 750-900° C., for 5-240 min; and
the carbon source gas is methane or ethane, which is used at a flow rate of 10 to 500 ml/(min·g nickel-aluminum precursor).

18. A method for decomposition of nitrous oxide, comprising: contacting the carbon-coated nickel-aluminum nanocomposite according to claim 1 with nitrous oxide to generate nitrogen and oxygen.

19. A process of catalytically oxidizing volatile organic compounds, comprising: using the carbon-coated nickel-aluminum nanocomposite according to claim 1 as a catalyst for catalyzing the oxidation of volatile organic compounds.

20. The process according to claim 19, wherein the oxidation reaction comprises catalytic combustion of a mixed gas containing volatile organic compounds and a standard gas containing oxygen by contacting the mixed gas with the catalyst.

21. The process according to claim 20, wherein the mixed gas comprises 0.1-2 vol % of the volatile organic compounds, and 5-20 vol % of oxygen.

22. The process according to claim 19, wherein the volatile organic compound is one or more selected from the group consisting of hydrocarbons having 1 to 4 carbon atoms.

23. The process according to claim 19, wherein the oxidation reaction is carried out at a space velocity of 1000-5000 ml reaction gas/(hour·g catalyst).

24. The process according to claim 19, wherein the oxidation reaction is carried out at a temperature of 300° C. to 450° C.

* * * * *